US008228442B2

(12) United States Patent
Yi

(10) Patent No.: US 8,228,442 B2
(45) Date of Patent: Jul. 24, 2012

(54) TUNER SELECTION IN DIGITAL BROADCASTING RECEIVER HAVING MULTIPLE TUNERS

(75) Inventor: Ho Yi, Seongnam-si (KR)

(73) Assignee: HUMAX Co., Ltd., Gyeonggi-Do (KR)

(*) Notice: Subject to any disclaimer, the term of this patent is extended or adjusted under 35 U.S.C. 154(b) by 1317 days.

(21) Appl. No.: 11/872,282

(22) Filed: Oct. 15, 2007

(65) Prior Publication Data

US 2008/0117335 A1 May 22, 2008

(30) Foreign Application Priority Data

Nov. 16, 2006 (KR) ........................ 10-2006-0113200

(51) Int. Cl.
*H04N 5/50* (2006.01)
*H04N 7/20* (2006.01)
*G06F 3/00* (2006.01)

(52) U.S. Cl. ............. 348/731; 348/732; 725/38; 725/63

(58) Field of Classification Search .......... 348/731–732; 725/38, 63
See application file for complete search history.

(56) References Cited

U.S. PATENT DOCUMENTS 5,757,441 A 5/1998 Lee et al.
6,133,910 A 10/2000 Stinebruner
6,519,011 B1 2/2003 Shendar
6,980,529 B1 * 12/2005 Arsenault ..................... 370/316
7,929,062 B2 * 4/2011 Oh ................................ 348/732
2006/0035610 A1 * 2/2006 Potrebic ...................... 455/178.1
2006/0150219 A1 7/2006 Lee et al.

FOREIGN PATENT DOCUMENTS

EP 0 669 725 6/1994
EP 0 967 746 12/1999
EP 0 967 749 12/1999
EP 1 355 496 10/2003
JP 2004-064478 2/2004

OTHER PUBLICATIONS

European Search Report dated Feb. 9, 2009.
European Search Report dated Dec. 19, 2008.
European Search Report dated Oct. 21, 2011.

* cited by examiner

*Primary Examiner* — Kristine Kincaid
*Assistant Examiner* — Gigi L Dubasky
(74) *Attorney, Agent, or Firm* — KED & Associates, LLP

(57) ABSTRACT

A digital broadcasting receiver having multiple tuners and a method of selecting a tuner in the digital broadcasting receiver. An embodiment of the present invention attempts to tune each tuner with transponder data of a satellite being connected to a digital broadcasting receiver having multiple tuners and selects one tuner to search channels according to the result of tuning. The transponder input procedure and the following tuner selection procedure can be omitted such that the tuner selection procedure can be simplified.

11 Claims, 10 Drawing Sheets

SEPARATE TYPE

TUNER SELECTION IN DIGITAL BROADCASTING RECEIVER HAVING MULTIPLE TUNERS

CROSS-REFERENCE TO RELATED PATENT APPLICATIONS

This application claims the benefit of Korean Patent Application No. 10-2006-0113200, filed on Nov. 16, 2006, in the Korean Intellectual Property Office, the disclosure of which is incorporated herein in its entirety by reference.

BACKGROUND OF THE INVENTION

1. Field of the Invention

The present invention relates to a digital broadcasting receiver, particularly to a digital broadcasting receiver having multiple tuners and a method of selecting a tuner in the digital broadcasting receiver.

2. Description of the Related Technology

Generally, a digital broadcasting receiver is equipped with a PVR (Personal Video Recorder) function for recording a digital broadcasting program on a recording medium such as an HDD (Hard Disc Drive), and can be connected to a satellite broadcasting antenna and a television. This digital broadcasting receiver sometimes has multiple tuners so as to allow a user to watch one channel in a PIP (Picture in Picture) mode or record one channel while watching another channel.

In addition, the digital broadcasting receiver has a channel search function, which should be performed before the first use of the digital broadcasting receiver and is performed periodically to update channel data in use.

FIG. 1 is a flowchart showing how a digital broadcasting receiver having two tuners typically searches for channels.

Referring to FIG. 1, in step 110, an antenna of a satellite connected to the digital broadcasting receiver is physically configured to the digital broadcasting receiver, and this process is called “antenna connection state setup.”

After setting the antenna connection state, in step 120, “antenna setting” is performed to configure satellite data, LNB data, on/off of 22 KHz tone, and a value of Diseqc switch, which are antenna setting conditions.

The Diseqc switch is a device for automatically selecting an antenna when there are plural antennas, and can select up to four (4) antennas.

After setting the antenna, in step 130, a tuner connected to the antenna is selected, and this is referred to as “tuner selection.”

After the antenna setting and before the tuner selection, or after the tuner selection, transponder data is inputted in step 140 for “channel search”.

Conventionally, the user had to manually select the tuner. However, since it is not easy for ordinary users to understand the input condition for tuner selection, most users had to rely on the technician to setup the digital broadcasting receiver. Not only is this costly and time-consuming, but also this procedure had to be repeated every time a new channel is added.

SUMMARY OF CERTAIN INVENTIVE ASPECTS

The present invention provides a digital broadcasting receiver and a method of selecting a tuner that make a tuning by use of transponder data in a transponder list corresponding to a satellite connected to the digital broadcasting receiver and select a tuner in accordance with the tuning result, thereby automating or simplifying the tuner selection.

An aspect of the present invention features a method of selecting a tuner in a digital broadcasting receiver having multiple tuners. In the method, each tuner is tuned with at least one of transponder data corresponding to a satellite to be searched, tuning completion rates of each tuner are produced, and a tuner to search channels of the satellite is selected to correspond to the tuning completion rates.

Another aspect of the present invention features a method of selecting a tuner in a digital broadcasting receiver having multiple tuners. If only one tuner completes tuning as a result of attempting to tune each tuner with at least one of transponder data corresponding to a satellite to be searched, channels of the satellite are searched by the tuner. If two or more tuners complete tuning, one tuner is selected to search the channel according to the identicalness of output signals from the tuners.

Yet another aspect of the present invention features a digital broadcasting receiver, which includes: a plurality of tuners; a transponder data storage, storing at least one of transponder data of a satellite to be searched; and a controller, selecting one tuner to search a channel of the satellite from the plurality of tuners in accordance with a plurality of tuning completion rates being produced by tuning the plurality of tuners with the transponder data.

Still another aspect of the present invention features a digital broadcasting receiver, which includes: a plurality of tuners; a controller, resulted from attempting to tune each tuner with transponder data corresponding to a satellite to be searched, selecting one tuner to search a channel if only one tuner completes tuning, or selecting one tuner from the plurality of tuners according the identicalness of output signals of the tuners if two or more tuners complete tuning; and a user interface, displaying a UI (User Interface) screen to receive an input signal.

DESCRIPTION OF CERTAIN INVENTIVE EMBODIMENTS

Figure 1:
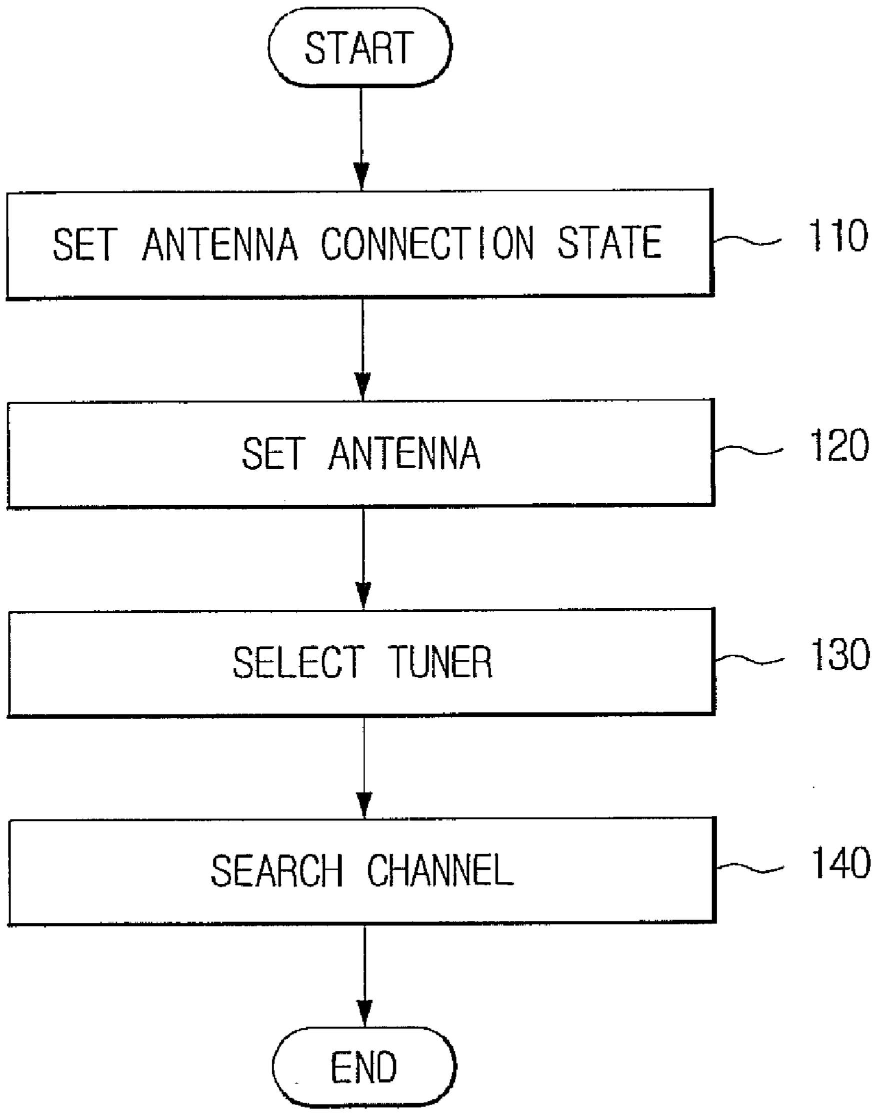
FIG. 1 PRIOR ART
FIG. 1 is a flowchart showing a typical channel search procedure in a digital broadcasting receiver having multiple tuners.

As described above, the embodiment of present invention can search channels by automated input step of transponder data and selecting step of tuner thereof. Also, another embodiment of present invention can simplify the tuner selection procedure and save tuner selection time by allowing user’s manual tuner selection only when output signals of each tuner are different.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, for the convenience of description, an example of having two tuners (a first tuner and a second tuner) will be mainly described. It shall be apparent, however, that the present invention can be embodied in the same or similar manner in a case of having three or more tuners.

In addition, before describing some embodiments of the present invention, a menu list in a satellite connected to a digital broadcasting receiver and an antenna connection state will be described in detail.

Figure 2:
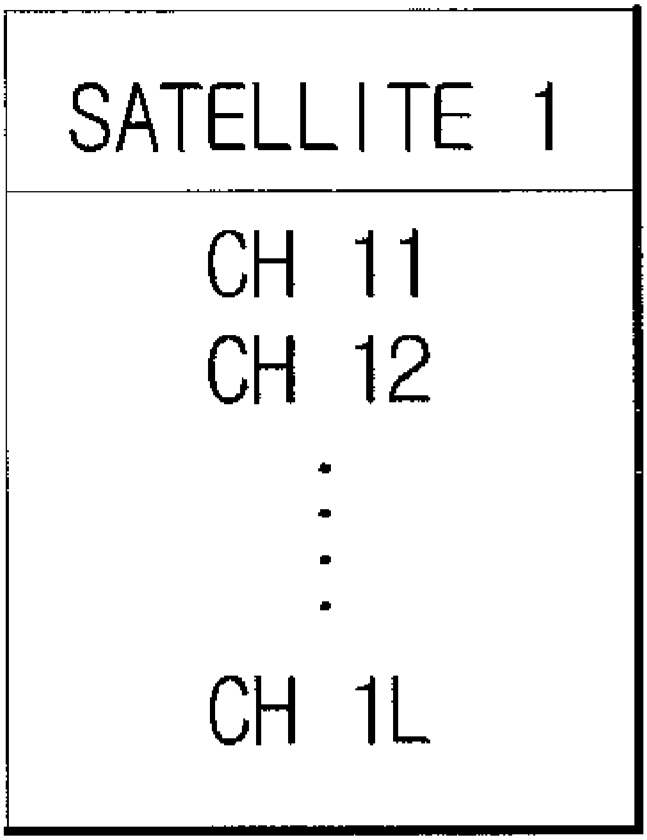
FIGS. 2 to 4 show a menu list in a satellite connected to a digital broadcasting receiver.
Figure 3:
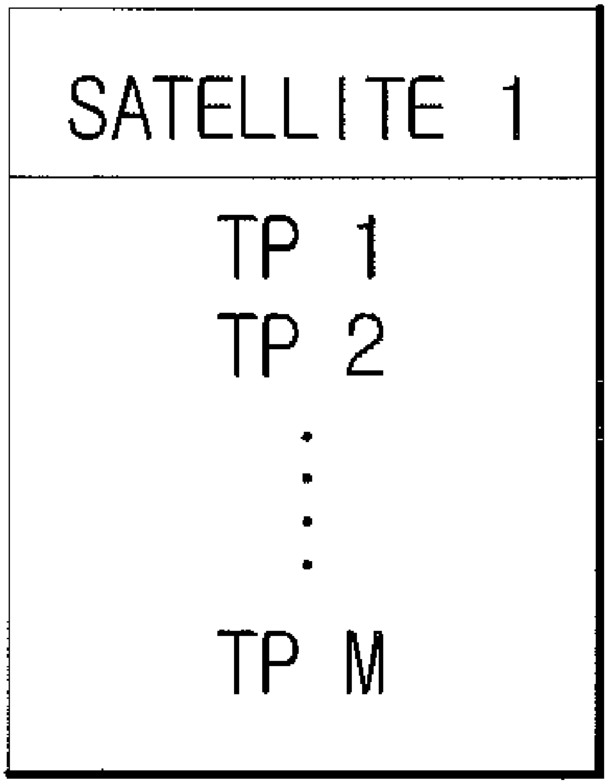
Figure 4:
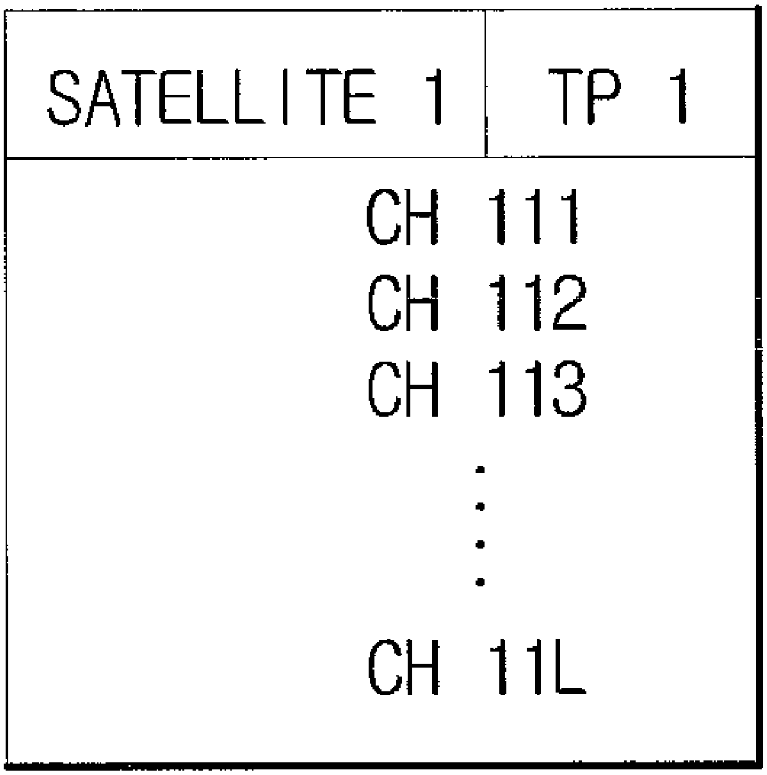

FIG. 2 to FIG. 4 show a menu list in a satellite connected to the digital broadcasting receiver.

Referring to FIG. 2 to FIG. 4, each satellite has more than one transponder (TP) data. Several tens of transponders are installed in each satellite delivering digital satellite broadcasting signals, and this list of transponders is referred to as transponder list. Also, although there is no limit on the number, several to several tens of channels are set up in each transponder within the range of data transmission rate of signal being transmitted. The digital broadcasting receiver can receive various satellite broadcasting signals through the plural channels that are set up as described above.

Here, the transponder, which is referred to as a "channel group", is a satellite relay that receives a radio wave transmitted from a broadcasting station on the ground and then amplifies and retransmits the radio wave back to the ground.

Satellite broadcasting data is managed separately in the digital broadcasting receiver. For example, a sub menu linked with satellite 1 among the plural satellites consists of channels (CH111-CH11L) that belong to satellite 1, as shown in FIG. 2, or transponders (TP 1-TP M) included in satellite 1, as shown in FIG. 3. Also, a sub menu of TP 1 consists of channels (CH111-CH11L) included in TP 1, as shown in FIG. 4.

Figure 5:
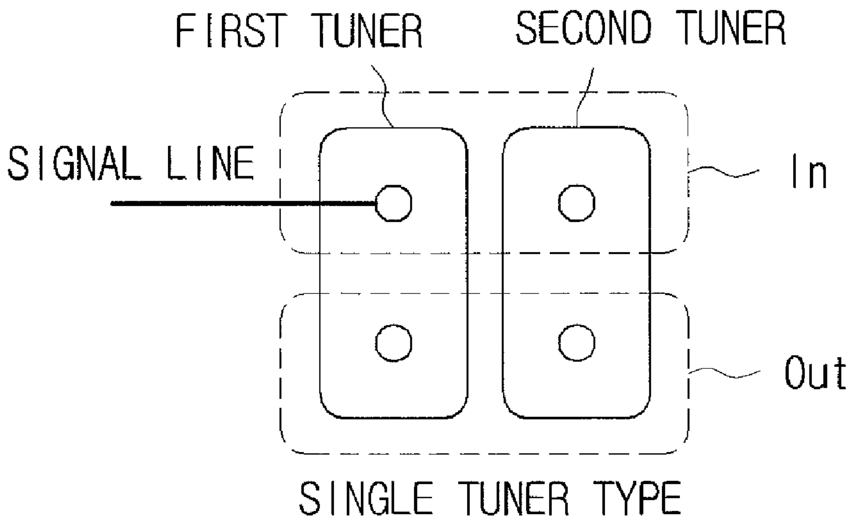
FIGS. 5 to 7 show the antenna connection state of a digital broadcasting receiver having two tuners.
Figure 6:
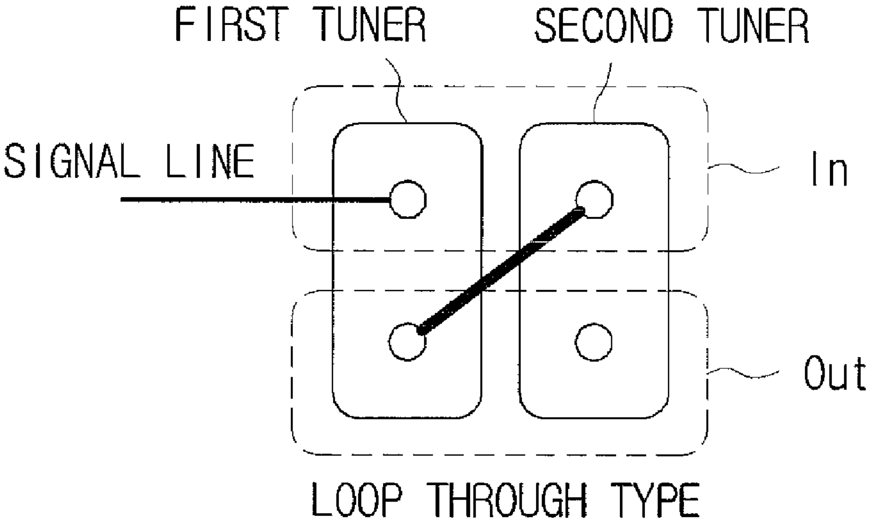
Figure 7:
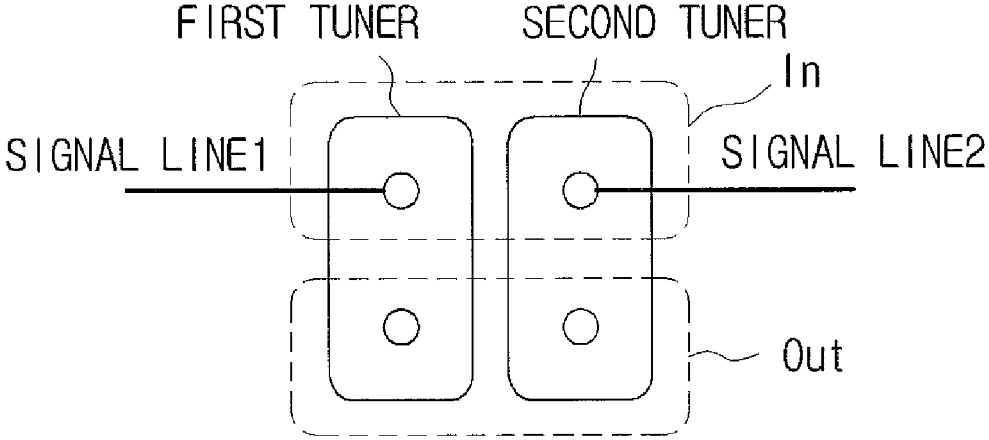

FIG. 5 to FIG. 7 show the antenna connection state of the digital broadcasting receiver having two tuners.

Referring to FIG. 5 to FIG. 7, the antenna connection state can be one of a single tuner type, loop-through type, and separate type. The single tuner type connects the antenna to one tuner, and if the digital broadcasting receiver has two tuners, the antenna is connected to one of the first tuner or the second tuner (FIG. 5). In the loop-through type, two tuners share an LNB signal inputted via one signal line (FIG. 6), and in the separate type, the LNB signals coming from two signal lines are tuned by two tuners independently (FIG. 7).

Hereinafter, some embodiments will be described in detail with reference to the accompanying drawings. In describing the present invention, identical or corresponding elements will be given the same reference numerals, regardless of the figure number.

Figure 8:
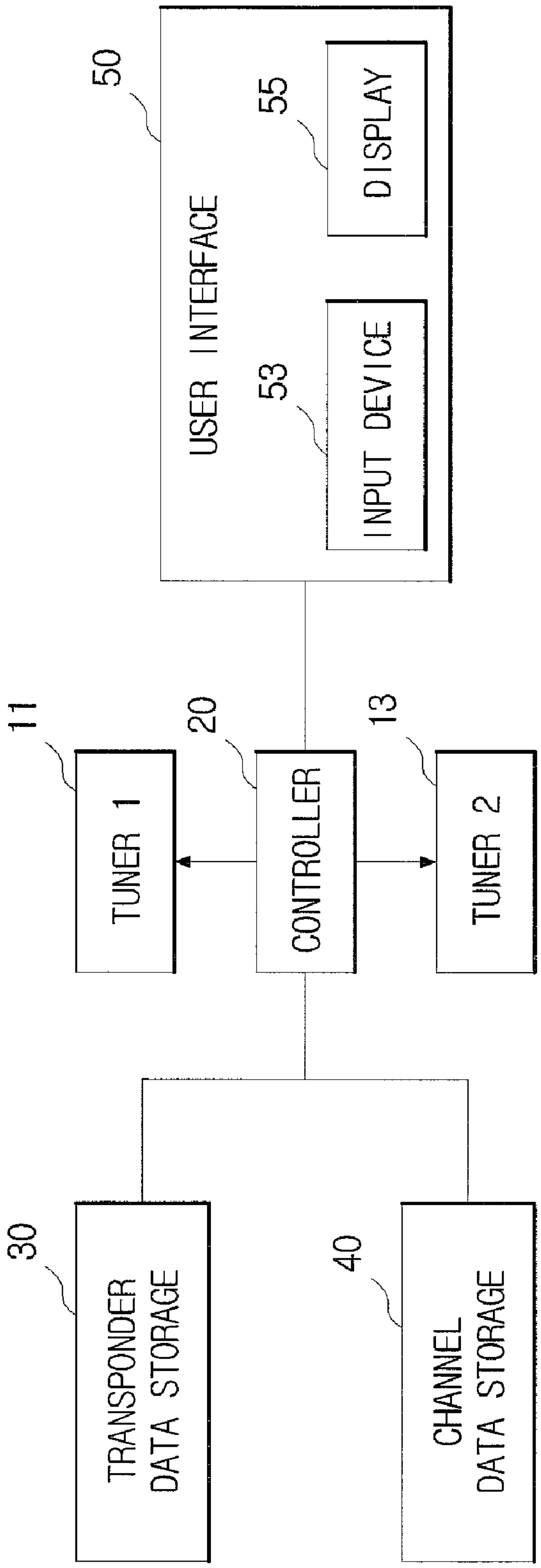
FIG. 8 is a block diagram of a digital broadcasting receiver having two tuners in accordance with an embodiment of the present invention.

FIG. 8 is a block diagram of a digital broadcasting receiver having two tuners according to an embodiment of the present invention.

As shown in FIG. 8, the digital broadcasting receiver according to this embodiment includes a first tuner 11, a second tuner 13, a controller 20, a transponder data storage 30, a channel data storage 40, and a user interface 50.

Each of the first tuner 11 and the second tuner 13 receives a converted signal from an LNB (Low Noise Block down converter), which converts high frequency signals inputted from the antenna, and extracts video signals and audio signals from the converted signals for transmission to a TV or another device.

The LNB converts a high frequency of 4~12 GHz transmitted from a satellite into an intermediate frequency of 1 GHz, and is located in the center of an antenna.

The controller 20 operates on receiving a tuner selection request by the user or on a predetermined period to recognize the transponder list, i.e., the frequency list to be searched by a tuner in charge, obtains channel data by providing each transponder data in the recognized transponder list to the tuner in charge, and stores it on the channel data storage 30.

In addition the controller 20 entirely controls the operation of the digital broadcasting receiver by determining whether or not each tuner completes tuning, and whether or not output signals from each tuner are the same by decoding PSI/SI data from the transport stream of the transponder.

The channel data storage 30 stores channel data searched by the tuner. For example, the channel data storage 30 may be embodied by a memory device such as a RAM, flash memory, or hard disc drive.

The transponder data storage 40 stores data of a satellite connected to the digital broadcasting receiver and transponder data of the satellite. The transponder data includes frequencies, symbol rates, FEC values, and polarization of each transponder, and the transponder list and transponder data can be pre-stored in the digital broadcasting receiver, for example, by referencing a website in which updated satellite data can be found.

The user interface 50 provides an interface to the user, and includes, for example, a display (e.g., an LCD) 55 and an input device (e.g., a button, a switch, etc.) 53. In case it is not possible to select a tuner automatically, the user interface 50 displays a UI (User Interface) screen to allow the user to select any one of the tuners to the satellite to be searched, and receives input of a selection signal for the designated tuner.

Hereinafter, the procedure of selecting a tuner by the digital broadcasting receiver having two tuners according to an embodiment of the present invention will be described.

Figure 9:
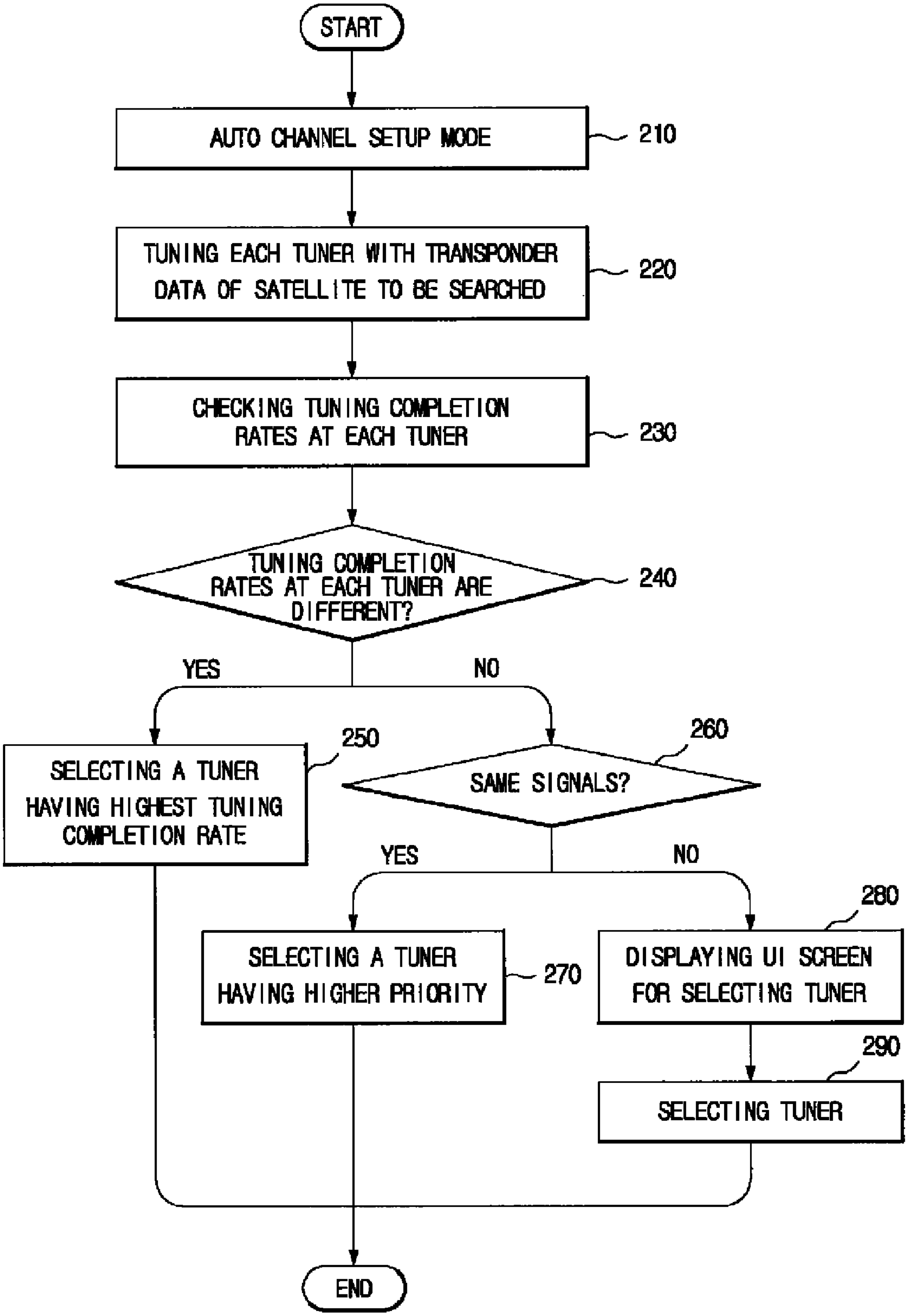
FIG. 9 is a flowchart of selecting a tuner in a digital broadcasting receiver in accordance with an embodiment of the present invention.

FIG. 9 is a flowchart of selecting a tuner in the digital broadcasting receiver according to an embodiment of the present invention.

Referring to FIG. 9, in step 210, when an auto tuner selection request is received or inputted by selecting an auto channel setup mode key, the digital broadcasting receiver in step 220 searches one of the transponder list of one of the satellites being connected to the digital broadcasting receiver, and tunes the first tuner 10 and the second tuner 13 by successively using all transponder data such as frequency, symbol rate, FEC value, and polarization.

It is assumed that the list of satellites connected to the digital broadcasting receiver is already inputted in the digital broadcasting receiver prior to selecting the tuner, and the transponder list of the satellites and each of the transponder data are also already stored in the transponder data storage 30.

When tuning on all of the transponder data is complete, the digital broadcasting receiver determines whether each tuner is successfully tuned for each transponder, and collects the results of the determination to calculate a tuning completion rate in step 230. The tuning completion rate can be, for example, the total sum of the number of completion for the tuner over all transponders.

The reason why the tuning is performed by use of all of the transponder data to find the tuner connected to the satellite to be searched is because it may not be possible to determine through which tuner the signal comes in based on the completion of tuning by use of one of the transponder data only. For example, although there are signals coming into each tuner from different satellites, if the number of TP that the satellite has increases, it may happen that tuning data (frequency, symbol rate, FEC, polarization, etc.) of each satellite is overlapped within the general input frequency range, 950~2150 MHz. Namely, if each tuner performs the tuning with similar transponder data, the digital broadcasting receiver cannot determine which tuner is connected to the satellite to be searched. According to the embodiment, however, even if there is an unknown signal input, the wrong search due to the aforementioned reason can be prevented.

In step 240, the digital broadcasting receiver compares the tuning completion rates of each tuner. If the tuning completion rates of each tuner are different from each other, it is determined that the tuner of a higher tuning completion rate is connected to the satellite to be searched, and the tuner is selected in step 250.

For example, in a digital broadcasting receiver having two tuners, assuming that there are 1 to 10 transponders (TP, 1, TP2 . . . TP 10) for the satellite and both tuners are tuned to the data of TP 1 concurrently, the digital broadcasting receiver recognizes the tuning completion of both the first tuner 11 and the second tuner 13. Assuming that the first tuner completes 8 times and the second tuner completes 3 times after tuning to TP 1 to TP 10 successively, the tuning completion rates of each tuner are calculated to be 80% and 30% respectively, and since the first tuner's completion rate is higher than the second tuner's, the digital broadcasting receiver determines that the satellite to be searched is connected to the first tuner 11.

Therefore the user does not need to manually input the transponder data (frequency, symbol rate, FEC value, and polarization, etc.) or to select tuner any more.

If both tuners have same tuning completion rates, PSI data as defined in ISO/IEC 13181-1 or SI data as defined in EN 300 468 from transport stream is analyzed to determine whether both signals are identical, in step 260.

Here, the PSI (program specific information), which is program selection data on a program control table being transmitted by use of MPEG-2 transport stream, is defined in ISO/IEC 13818-1, and the SI is defined in ETSI EN 300 468.

If it is determined that the signals in both tuners are identical, the tuner having higher predetermined priority is selected at step 270.

If it is determined, however, that the signals in both tuners are not identical, the user interface 50 displays a UI screen for the user to select the tuner connected to the satellite to be searched, in step 280. According to the input from the user, the digital broadcasting receiver selects the tuner connected to the satellite to be searched, in step 290.

Step 220 to step 290 are repeated as many times as the number of antennas connected to the digital broadcasting receiver to select the tuners for receiving signals from each satellite.

In addition, the method of selecting a tuner according to the embodiment is more effective with the separate type of antenna connection. In the single tuner type or loop-through type, one signal line is connected so it may be not needed to select the tuner. However, in case each antenna connected to a different satellite is connected to each tuner in the separate type, the signal lines coming into each tuner are different so it is needed to select the tuner to determine from which satellite the signal comes.

Figure 10:
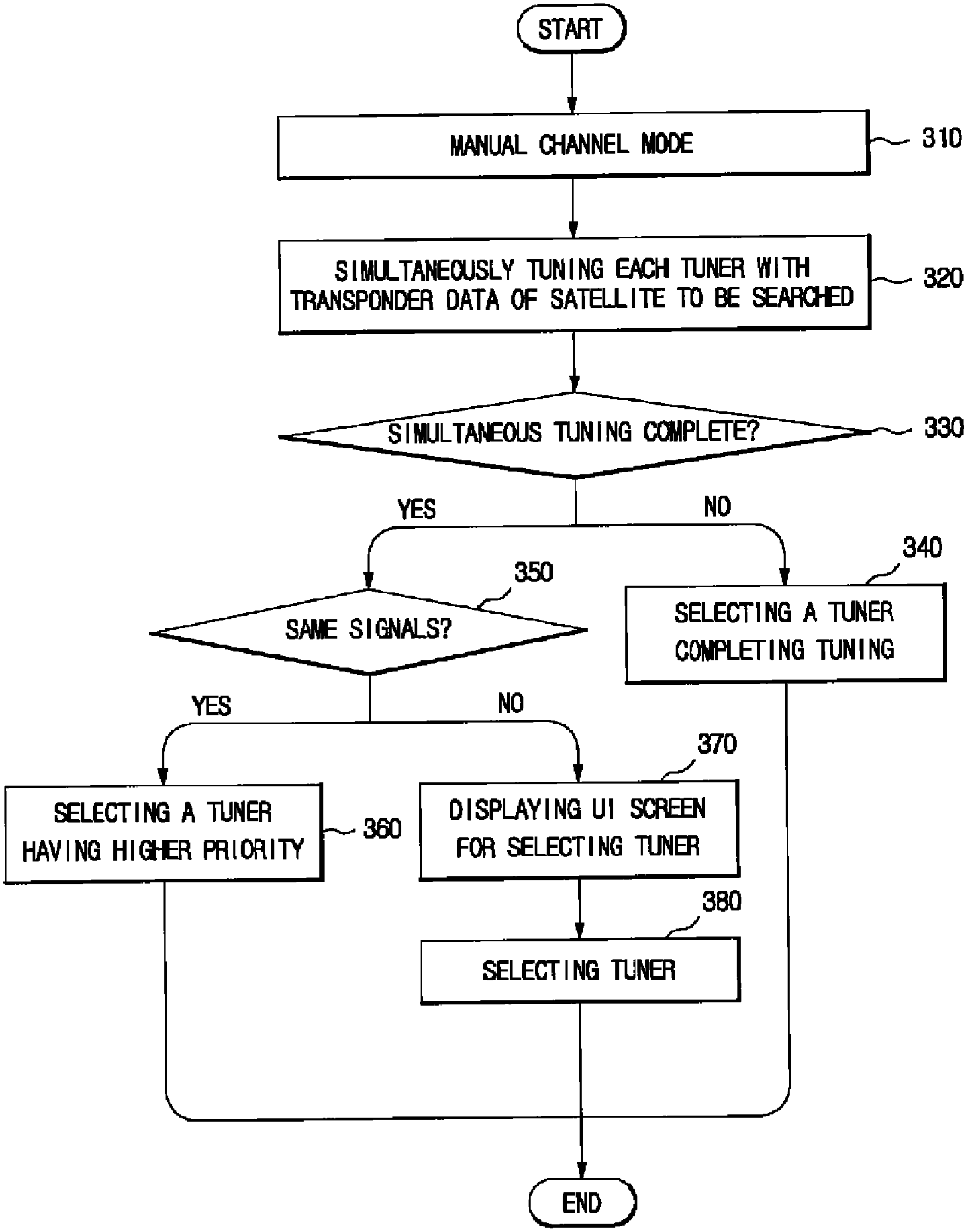
FIG. 10 is a flowchart of selecting a tuner in a digital broadcasting receiver in accordance with another embodiment of the present invention.

FIG. 10 is a flowchart of selecting a tuner in the digital broadcasting receiver according to another embodiment of the present invention.

Referring to FIG. 10, in step 310, when a tuner selection request is received or inputted by selecting a manual tuner selection mode key, the digital broadcasting receiver in step 320 makes each tuner simultaneously perform the tunings with one of the transponder data (frequency, symbol rate, FEC, polarization, etc.) of the satellite to be searched and, in step 330, determines the completion of tuning.

If only one of the two tuners completes tuning, the digital broadcasting receiver searches a channel on the complete tuner in step 340.

However, if all tuners complete the tuning, the controller 20 analyzes THE PSI data as defined in ISO/IEC 13181-1 or the SI data as defined in EN 300 468 from a transport stream to determine whether both signals are identical, in step 350.

If it is determined that the signals in both tuners are identical, in step 360, the tuner having a higher predetermined priority is selected. In this case, it is better for the user not to manually set the tuner on a menu.

If it is determined, however, that the signals in both tuners are not identical, in step 370, the digital broadcasting receiver displays a user interface screen on a display device (e.g., LCD) for the user to select one out of the two tuners. After this, in step 380, the tuner is selected according to the input signal from an input device.

The present invention is not intended to limit to the aforementioned embodiments, and it is also possible for those who skilled in the art to make various modifications, changes, and additions within the mete and scope of the present invention

What is claimed is:

1. A method of selecting a tuner in a digital broadcasting receiver having multiple tuners, comprising:

tuning each tuner with at least one of transponder data corresponding to a satellite to be searched;

calculating a tuning completion rate of each tuner; and selecting a tuner to search channels of the satellite by referencing the calculated tuning completion rate of each tuner, wherein selecting a tuner includes selecting a tuner with a highest tuning completion rate from among the multiple tuners, and wherein the tuning completion rate is a total sum of a number of completions for the tuner over all transponders.

2. The method of claim 1, wherein when two or more tuners have the same highest tuning completion rate, the selecting comprises:

determining whether or not a signal outputted from each of the tuners is identical to each other; and when the signal output from each of the tuners is identical to each other, selecting a tuner having a higher predetermined priority.

3. The method of claim 2, wherein when the signal output from each of the tuners is not identical to each other, a tuner is selected to correspond to an input signal for tuner selection.

4. The method of claim 2, wherein identicalness of the signal outputted from each of the tuners is determined by interpreting PSI/SI data from a transport stream of a transponder.

5. The method of claim 1, wherein tuning each tuner includes tuning each tuner by use of all of the transponder data corresponding to the satellite to be searched.

6. The method of claim 1, wherein the tuning, the calculating and the selecting are repeated as many times as a number of antennas connected to the digital broadcasting receiver.

7. The method of claim 1, wherein an antenna connection state of the digital broadcasting receiver is a separate type.

8. The method of claim 1, wherein the transponder data is pre-stored in the digital broadcasting receiver.

9. A digital broadcasting receiver comprising:

a plurality of tuners;

a transponder data storage to store transponder data of a satellite to be searched; and a controller, to select one tuner to search a channel of the satellite from the plurality of tuners by referencing tuning completion rates resulted from tuning the plurality of tuners by use of the transponder data, wherein the controller selects a tuner having a highest tuning completion rate, and wherein the tuning completion rate is a total sum of a number of completions for the tuner over all transponders.

10. The digital broadcasting receiver of claim 9, wherein when two or more tuners have the same highest tuning completion rate, the controller determines whether or not output signals from both tuners are identical; and the controller selects a tuner having a predetermined higher priority when the output signals from both tuners are identical, and selects a tuner corresponding to an input signal when the output signals from both tuners are not identical.

11. The digital broadcasting receiver of claim 9, further comprising a channel data storage to store channel data of a searched channel when the channel search by the selected tuner is stopped or completed.

* * * * *